2,942,012
16-KETO STEROIDS OF THE PREGNANE SERIES AND METHODS FOR MAKING SAME

David Taub, Metuchen, and Norman L. Wendler, Summit, N.J., assignors to Merck & Co., Inc., Rahway, N.J., a corporation of New Jersey No Drawing. Filed Nov. 28, 1956, Ser. No. 624,945

29 Claims. (Cl. 260—397.45)

This invention relates to a new class of oxygenated steroids. More particularly, it is concerned with steroids of the pregnane series having a ketone function in ring D of the molecule. Still more particularly, it relates to 16,20-diketo-17α-hydroxy steroids of the pregnane series, which new compounds have the partial structural formula—

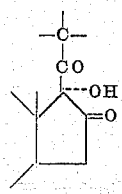

It is, of course, well known that the pharmacological or physiological activity of the adrenal cortical hormones may be modified or increased by certain structural changes in the molecule, such as by the introduction of a double bond in the 1:2 positions of the steroid nucleus or by halogenation at the 9-position. The search to improve the activity of such hormones still further has been a difficult one and several attempted modifications in the structure of physiologically active steroids have resulted in loss or diminution of activity. We have now discovered, however, that introduction of a ketone function at the 16-position of 17α-hydroxy-20-keto pregnanes gives rise to new compounds having increased anti-inflammatory activity without any substantial degree of undesirable side effects, such as retention of sodium.

It is therefore an object of our invention to provide a new series of steroids of the pregnane series, which compounds have a ketone group in the C–16 position. It is a further object to provide 16,20-diketo-17α-hydroxy steroids of the pregnane series and processes for making such compounds from $\Delta^{16}$-20-keto pregnenes. Still another object is a synthetic method of making 16,20-diketo-17α-hydroxy steroids by treatment of a $\Delta^{16}$-20-keto steroid with a metal oxide and a peroxide compound. Such 16-keto steroids of the pregnane series are themselves physiologically active compounds having enhanced cortisone-like activity and of value in the treatment of inflammatory and allergic conditions, or are important intermediates in the synthesis of physiologically active 16-keto-pregnenes or pregnadienes. A more particular object is the synthesis of 16,20-diketo-17α-hydroxy steroids by reaction of a $\Delta^{16}$-20-keto steroid with a metal oxide such as osmium tetroxide and a peroxide compound such as hydrogen peroxide. Additional and further objects will appear from the detailed description of the invention hereinbelow.

The new compounds of our invention may be produced by treating a $\Delta^{16}$-20-keto steroid with a metal oxide and a peroxide compound, as shown by the flowsheet:

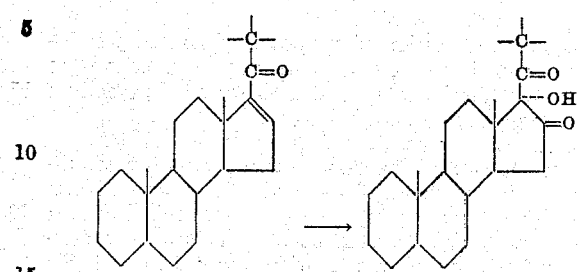

The critical structural feature of the starting material for making 16,20-diketo-17α-hydroxy steroids of the pregnane series is the $\Delta^{16}$-20-keto moiety. The molecule may be substituted or unsubstituted in other portions of the molecule and may also be unsaturated. Thus $\Delta^{1}$, $\Delta^{4}$ or $\Delta^{9(11)}$ steroids, or compounds having substituents such as keto, hydroxy, esterified hydroxy, chlorine, bromine, fluorine and/or methyl groups on the nuclear or 21-carbon atoms are suitable reactants. Double bonds in the molecule (other than the $\Delta^{16}$-bond) which are in hindered portions of the molecule such as at the $\Delta^{9(11)}$ position or are conjugated with a carbonyl group, are inert under the conditions of our process. However, other double bonds are apt to react with osmium tetroxide-hydrogen peroxide and should be protected chemically prior to the reaction in order to avoid undesirable side reactions.

As the metal oxide in our process, we prefer to use osmium tetroxide, although other metal oxides which add to a carbon-carbon double bond, e.g. tungsten trioxide, may also be employed. The peroxide compound which is preferred is hydrogen peroxide, other suitable peroxides being alkyl peroxides such as t-butyl hydroperoxide or peracids such as peracetic, perbenzoic or perphthalic acids. The oxidation is carried out in a solvent inert under the reaction conditions. Suitable solvents are tertiary alkanols such as tertiary butanol and tertiary amyl alcohol, halogenated hydrocarbons like carbon tetrachloride, ethylene dichloride, methylene chloride, ethyl ether, benzene, dioxane, ethyl acetate and the like.

In this process, only relatively small percentages of metal oxide, based on total steroid, are utilized. For optimum results we employ about 0.01 to 0.25 mole, and preferably about 0.1 mole, of osmium tetroxide per mole of pregnane compound. However, an excess of peroxide compound is desirable. Usually about a 100% excess, again based on the steroid reactant, is used for best results, although from about 10% to about 200% excess is satisfactory.

To carry out the oxidation, one of the reagents is mixed with a solution of the steroid reactant, and a solvent solution of the second reagent added slowly thereto. We prefer to add an osmium tetroxide solution slowly to a mixture of pregnane compound and hydrogen peroxide. However, the desired 16,20-diketo-17α-hydroxy pregnane compound is produced in good yield by the alternate method of adding the hydrogen peroxide to the osmium tetroxide-steroid solution. In either case, the resulting 16-ketone may be isolated by the same standard techniques.

At the preferred reaction temperatures of about 20–45° C. optimum yields of desired 16,20-diketo-17α-hydroxy pregnane compounds are obtained in about 1–48 hours, and preferably in 3–10 hours, although considerably longer reaction times do not appear to affect the reaction adversely and may be utilized if desired.

At the completion of the reaction, the mixture is ordinarily treated with a small amount of reducing agent such as sodium sulfite or hydrogen sulfide for a sort period of time, after which the desired 16,20-diketo-17α-hydroxy steroid is recovered in substantially pure form by methods well known to those skilled in the art. Extraction into an organic solvent and crystallization from that solvent or from a mixture of solvents, either with or without chromatographic purification, are satisfactory techniques for isolating our new steroids.

The above discussion of our process for making 16,20-diketo-17α-hydroxy steroids of the pregnane series from $\Delta^{16}$-20-keto steroids is not restricted to specific members of the series since the oxidation reaction is of general application and does not depend for its success on the presence or absence of functional substituents or unsaturation in other portions of the molecule. For optimum yields in our process, we prefer that steroids having a 21-hydroxy group, be esterified at that position, preferably by formation of an ester with an organic carboxylic acid. Typical acids which may be used for this purpose are acetic, propionic, butyric, t-butylacetic, stearic, benzoic, oxalic, succinic, tricarballylic, phenylacetic, phthalic, dimethylacetic, trimethylacetic and the like. Likewise, the C-21 ester may be formed from an inorganic acid, for example sulfuric and phosphoric acids. In these cases, the corresponding 16,20-diketo-17α-hydroxy-pregnane 21-ester is produced.

Of particular importance are 16,20-diketo-17α-hydroxy steroids unsaturated in ring A in the 1:2 and/or 4:5 positions and having the functional substituents shown in formula I:

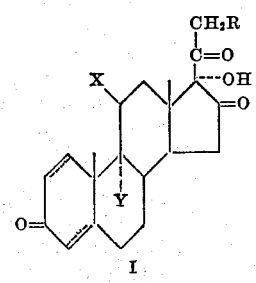

wherein X is an oxygen containing substituent, Y is halogen and R is hydroxy or an esterified hydroxy group. The ester is preferably one of the pregnane alcohols with a lower aliphatic carboxylic acid, e.g. acetic, propionic, butyric acids, although other organic acids such as benzoic, oxalic, or phenylacetic and inorganic acids such as sulfuric and phosphoric may be used to form the ester. These 16,20-diketo-17α-hydroxy steroids, which are obtained from the corresponding $\Delta^{16}$-20-keto steroid compounds have pronounced cortisone-like activity.

16,20-diketo-17α-hydroxy steroids of the pregnane series which may be made by the process of this invention from $\Delta^{16}$-20-keto steroids are $\Delta^4$-pregnene-11β,17α,21-triol-3,16,20-trione;
$\Delta^4$-pregnene-11β,17α,21-triol-3,16,20-trione 21-acetate;
$\Delta^4$-pregnene-11β,17α,21-triol-3,16,20-trione 21-benzoate;
$\Delta^4$-pregnene-11β,17α,21 - triol - 3,16,20 - trione 21-t-butyl acetate;
9α-fluoro-$\Delta^4$-pregnene-11β,17α,21-triol-3,16,20 - trione 21-acetate;
9α-fluoro-$\Delta^4$-pregnene-11β,17α,21-triol-3,16,20 - trione 21-propionate;
9α-fluoro-$\Delta^4$-pregnene-11β,17α,21-triol-3,16,20-trione;
9α-fluoro-$\Delta^{1,4}$-pregnadiene-11β,17α,21-triol-3,16,20 - trione 21-acetate;
9α-fluoro-$\Delta^{1,4}$-pregnadiene-11β,17α,21-triol-3,16,20-trione;
9α-fluoro-$\Delta^{1,4}$-pregnadiene-11β,17α,21 - triol - 3,16,20-trione 21-phenylacetate;
9α-fluoro-$\Delta^{1,4}$-pregnadiene-11β,17α,21 - triol - 3,16,20-trione 21-propionate;
9α-fluoro-$\Delta^{1,4}$-pregnadiene-11β,17α,21-triol - 3,16,20 - trione 21-cyclopentylpropionate;
9α-fluoro-$\Delta^{1,4}$-pregnadien-17α,21-diol-3,11,16,20 - tetrone 21-acetate;
$\Delta^4$-pregnen-17α,21-diol-3,11,16,20-tetrone 21-butyrate;
$\Delta^4$-pregnen-17α,21-diol-3,11,16,20-tetrone 21-acetate;
$\Delta^4$-pregnene-3,16,20-trione;
$\Delta^4$-pregnen-17α,21-diol-3,16,20-trione 21-acetate;
$\Delta^5$-pregnen-3,17α,21-triol-16,20-dione-3,21-diacetate; and
9α-chloro-$\Delta^4$-pregnene-11β,17α,21 - triol - 3,16,20-trione 21-acetate.

It will be appreciated by those experienced in this art that, in synthesizing 16,20-diketo-17α-hydroxy pregnanes functionally substituted or unsaturated in other portions of the molecule, the 16-keto-17α-hydroxy functional moiety may be introduced in the final step of the synthesis from the appropriate $\Delta^{16}$-compound, or it may be integrated into the molecule at an earlier stage, and other desired functional groups such as 1:2 and/or 4:5 double bonds, 11-oxygenated groups, 9-halo substituents, 21-hydroxy or 21-ester functions introduced by known reactions into the 16-keto-17α-hydroxy compound. For instance, in synthesizing the physiologically active 9α-fluoro-$\Delta^{1,4}$-pregnadiene-11β,17α,21-triol-3,16,20 - trione 21-acetate, one may employ 9α-fluoro-$\Delta^{1,4,16}$-pregnatriene - 11β,21-diol-3, 20-dione 21-acetate as an intermediate in which case the desired compound is obtained directly by the herein disclosed process. Alternatively, when the osmium tetroxide-hydrogen peroxide reaction is carried out on 9α-fluoro-$\Delta^{4,16}$-pregnadiene-11β,21-diol-3,20-dione 21-acetate or on $\Delta^{4,16}$-pregnadiene-11β,21-diol-3,20-dione 21-acetate, the desired compound will not be obtained directly but can be readily made from the 16-keto-17α-hydroxylated product by introduction of a 1:2 double bond as described in Arch. Biochem. and Biophys. 59, 304 (1955) and introduction of the 9α-fluoro substituent by the method of Hirschmann et al. J. Am. Chem. Soc. 78, 4956 (1956).

A second embodiment of our invention is an alternate method of synthesizing 16,20-diketo-17α-hydroxy steroids comprising oxidation of a 16α,17α-dihydroxy-20-keto steroid. As the oxidizing agent, we prefer to use chromium trioxide, but other such as sodium dichromate, N-bromsuccinimide and N-bromacetamide may be employed. In this process, the oxidizing agent will act on other oxidizable groups in the molecule as well as on the 16-hydroxy group, so that such other functions should be suitably blocked or protected, as by esterification, prior to the oxidation. Using this process, we have, for instance, prepared $\Delta^4$-pregnen-17α,21 - diol-3,11,16,20-tetrone 21-acetate (16-keto cortisone acetate) from $\Delta^4$-pregnen-16α,17α, 21-triol-3,11,20-trione 21-acetate (16 - hydroxycortisone acetate). The chromium trioxide oxidation is preferably effected in a suitably inert solvent medium such as acetic acid or pyridine at about 20° C. to about 35° C. At these temperatures optimum yields of 16-ketones are realized in about 5–20 hours and usually in about 5–15 hours. At increased temperatures, the reaction times may, of course, be reduced.

Our new physiologically active 16,20-diketo-17α-hydroxy steroids may be administered orally as tablets or capsules as anti-inflammatory agents or applied topically in the form of lotions or creams. A suitable tablet is prepared having the following ingredients:

| | Grams |
|---|---|
| 9α-fluoro-$\Delta^{1,4}$-pregnadiene-11β,17α,21-triol-3,16,20-trione 21-acetate | 0.075 |
| Lactose | 0.025 |
| Corn starch | 0.022 |
| Sucrose | 0.020 |
| Acacia (10% mucilage) | 0.002 |
| Magnesium stearate | 0.002 |

The steroid, lactose, corn starch and sucrose are mixed and wet with the acacia. The mass is then forced through a No. 8 mesh screen and dried, and the dried granules forced through a No. 12 mesh screen. These granules are mixed with the magnesium stearate and compressed into tablets using a 9/32 fraction inch deep cup punch. If desired, they may be coated with sugar by standard techniques.

A topical ointment containing one of our new physiologically active 16-keto steroids may be prepared by mixing 0.025 gram of steroid with about 0.1 gram of propylene glycol, milling the resulting paste and adding an additional 0.2 gram of propylene glycol. This mixture is then added to about 0.42 gram of milled polyethylene glycol, about 0.5 ml. of water is then added, the mixture stirred and powdered zinc stearate mixed in until the mass is partially congealed. The ointment is then milled.

Certain of the 16,20-diketo-17α-hydroxy pregnane compounds embraced within our invention are useful primarily as intermediates in making highly active 16-keto compounds. They are so converted by the introduction, by known methods, of functional moieties such as a 1:2 double bond, a 4:5 double bond, a 9-halo substituent, an 11-oxygenated function, a 21-hydroxy group or a 3-keto group into highly active 16,20-diketo-17α-hydroxy steroids of the pregnane series.

The following examples are given for purposes of illustration and not by way of limitation:

EXAMPLE 1

9α-fluoro-$\Delta^{4,16}$-pregnadiene-11β,21-diol-3,20-dione 21-acetate

One gram of 9α-fluoro-$\Delta^4$-pregnene-11β,17α,21-triol-3,20-dione 21-acetate is dissolved in 25 ml. of methanol and 5 ml. of dimethylformamide in a nitrogen atmosphere. To the resulting solution is added a slurry of 1.35 grams of semicarbazide hydrochloride and 0.74 gram of sodium bicarbonate in 3 ml. of water. The reaction mixture is stirred at reflux temperature for three and one-half hours and then at 40–45° C. for 16 hours. The resulting 3,20-disemicarbazone derivative of the starting material is precipitated by cooling and addition of 200 ml. of saturated sodium chloride solution. It is isolated by filtration, washed with water and dried.

One gram of the 3,20-disemicarbazone obtained above and 20 ml. of acetic acid and 1 ml. of acetic anhydride are refluxed under a nitrogen atmosphere for one hour. There is thus obtained a solution of the 3,20-disemicarbazone of 9α-fluoro-$\Delta^{4,16}$-pregnadiene - 11β,21 - diol-3,20-dione 21-acetate. Without isolation of this material, the reaction mixture is concentrated in vacuo to 10 ml. and treated with 5 ml. of water and 3 ml. of pyruvic acid. The mixture is allowed to stand at room temperature for about 24 hours, after which time water is added and the mixture extracted with chloroform. The chloroform extract is washed with water and potassium bicarbonate solution, and dried over magnesium sulfate. The chloroform solution is chromatographed on about 25 grams of neutral alumina and 9α-fluoro-$\Delta^{4,16}$-pregnadiene-11β,21-diol-3,20-dione 21-acetate obtained by concentration of the benzene-chloroform eluted fractions.

EXAMPLE 2

9α-fluoro-$\Delta^{4,16}$-pregnadien-21-ol-3,11,20-trione 21-acetate 0.5 gram of 9α-fluoro-$\Delta^4$-pregnen-17α,21-diol-3,11,20-trione 21-acetate in 10 ml. of methanol and 3 ml. of dimethylacetamide is mixed, under a nitrogen atmosphere, with a solution of 0.8 gram of semicarbazide hydrochloride and 0.4 gram of sodium bicarbonate in one ml. of water. The reaction mixture is heated at reflux for three hours and at 40 °C. for ten hours. The resulting 3,20-disemicarbazone derivative of the starting material is precipitated by addition of water and cooling in an ice bath. It is isolated by filtration and dried.

The disemicarbazone obtained above is refluxed for one hour in an inert atmosphere with 10 ml. of acetic acid and 1 ml. of acetic anhydride. The reaction mixture is then concentrated to about one-half the volume and treated with water and 2 ml. of pyruvic acid. At the end of 15 hours at 25° C., additional water is added and the mixture extracted with benzene. The benzene extract is washed with water and sodium bicarbonate solution, and dried. On chromatography over 12 grams of neutral alumina there is obtained in the benzene eluted fractions 9α-fluoro-$\Delta^{4,16}$-pregnadien-21-ol-3,11,20-trione 21-acetate.

EXAMPLE 3

$\Delta^4$-pregnene-11β,17α,21-triol-3,16,20-trione 21-acetate

To a stirred solution of 116 mg. of $\Delta^{4,16}$-pregnadiene-11β,21-diol-3,20-dione 21-acetate and 3 ml. of t-butanol is added 1.63 ml. of 0.37 M hydrogen peroxide in t-butanol and 8 mg. of osmium tetroxide in 1 ml. of t-butanol. The addition is carried out dropwise. The reaction is allowed to proceed for 48 hours at room temperature, after which time water is added and the mixture extracted with chloroform. The chloroform extract is concentrated in vacuo and the residue dissolve in 10 ml. of methanol. 100 mg. of sodium sulfite in 2 ml. of water is added to the methanolic solution and the mixture refluxed for 30 minutes. After cooling and addition of more water the mixture is extracted with chloroform. The chloroform is again removed by distillation and the residue treated at room temperature for five hours with 0.5 ml. of acetic anhydride in 1 ml. of pyridine. Ten ml. of water is then added to the back-acetylation reaction mixture and the desired steroid extracted with chloroform. The chloroform extract is chromatographed on about three grams of neutral alumina. Elution of the column with benzene-chloroform and concentration of the resulting eluates yields $\Delta^4$-pregnene-11β,17α,21-triol-3,16,20-trione 21-acetate.

The starting material for this reaction may be prepared as described in the Journal of the American Chemical Society 77, 1028 (1955).

EXAMPLE 4

$\Delta^4$-pregnen-17α,21-diol-3,11,16,20-tetrone 21-acetate

To a solution of 200 mg. of $\Delta^{4,16}$-pregnadien-21-ol-3,11,20-trione 21-acetate in 10 ml. t-butanol is added five drops of pyridine and 5 mg. of osmium tetroxide in 5 ml. t-butanol. Five ml. of a 0.4 M solution hydrogen peroxide in t-butanol is then added slowly over a period of 45 minutes. The resulting mixture is then stirred for an additional 30 minutes at room temperature. At the end of this time 300 mg. of sodium sulfite in 15 ml. of water is added and the resulting mixture stirred for about 10 minutes. It is then concentrated to about one-third the volume in vacuo and extracted with chloroform. The chloroform extract is washed with water and dried, and then chromatographed over 5 grams of neutral alumina. On elution of the column with benzene-chloroform, $\Delta^4$ - pregnen - 17α,21 - diol - 3,11,16,20 - tetrone 21-acetate is found in the eluate and may be isolated by concentrating in vacuo.

EXAMPLE 5

$\Delta^4$-pregnene-11β,17α,21-triol-3,16,20-trione

To a stirred solution of 100 mg. of $\Delta^4$-pregnene-11β,17α,21-triol-3,16,20-trione 21-acetate in 40 ml. of 90% methanol is added, at 20° C., 2 ml. of concentrated hydrochloric acid. The mixture is allowed to stand at about 25° C. for six hours and then 150 ml. of water is added. The resulting suspension is cooled and the crystalline $\Delta^4$-pregnene-11β,17α,21-triol-3,16,20-trione filtered, washed with water and dried in vacuo.

EXAMPLE 6

*9α-fluoro-$\Delta^4$-pregnene-11β,17α,21-triol-3,16,20-trione 21-t-butyl acetate*

The 9α-fluoro-$\Delta^{4,16}$-pregnadiene-11β,21-diol-3,20-dione 21-acetate of Example 1 is converted to the corresponding free alcohol by treatment with methanolic hydrochloric acid at room temperature as described in Example 5. From this free alcohol, 9α-fluoro-$\Delta^{4,16}$-pregnadiene-11β,21-diol-3,20-dione 21-t-butyl acetate is obtained by treating the former compound with an excess of t-butyl acetyl chloride in the presence of pyridine at room temperature.

To a stirred solution of 121 mg. of 9α-fluoro-$\Delta^{4,16}$-pregnadiene-11β,21-diol-3,20-dione 21-t-butyl acetate and 3 ml. of t-butanol is added 1.63 ml. of 0.37 M hydrogen peroxide in t-butanol. Eight mg. of osmium tetroxide in 1 ml. of t-butanol is added to the steroid dropwise over a period of about 30 minutes. The reaction mixture is allowed to stand at room temperature for 38 hours and, at the end of this time water is added and the steroid extracted with chloroform as described in Example 3. Following the isolation procedure set forth in Example 3 there is obtained 9α-fluoro-$\Delta^4$-pregnene-11β,17α,21-triol-3,16,20-trione 21-t-butyl acetate.

EXAMPLE 7

*$\Delta^{1,4}$-pregnadiene-11β,17α,21-triol-3,16,20-trione, and 21-acetate*

Fifty ml. of a nutrient medium are prepared having the following composition:

| | |
|---|---|
| Cerelose | grams 1 |
| Edamin | do 1 |
| Cornsteep liquor | ml 0.25 |
| Distilled water to make 50 ml. | |

This medium is adjusted to pH 6.5 with potassium hydroxide, sterilized and inoculated with about 2.5 to 5 ml. of a culture of *Bacillus sphaericus* (MB 431) microorganisms, and the inoculated culture is then incubated at a temperature of 28° C., with agitation, for a 24-hour period. To the resulting culture is added a solution containing 10 mg. of $\Delta^4$-pregnene-11β,17α,21-triol-3,16,20-trione 21-acetate dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated to dryness in vacuo. The residual material is dissolved in acetone and treated with charcoal and diatomaceous earth to remove colored impurities. The decolorized acetone solution is then streaked on paper chromatograms which are developed using formamide as the stationary phase and chloroform as the mobile phase. The upper bands are removed, extracted with methanol and the methanol extract again chromatographed by the paper streak method. The upper band is cut off, dried, extracted with methanol and the methanol extract concentrated to dryness in vacuo. The residue is crystallized from a mixture of ethyl acetate-petroleum ether to give crystalline $\Delta^{1,4}$-pregnadiene-11β,17α,21-triol-3,16,20-trione.

The $\Delta^{1,4}$-pregnadiene-11β,17α,21-triol-3,16,20-trione obtained as above is converted to its 21-acetate derivative by treatment with acetic anhydride in the presence of a small amount of pyridine.

EXAMPLE 8

*9α-fluoro-$\Delta^{1,4}$-pregnadien-17α,21-diol-3,11,16,20-tetrone*

Fifty ml. of a nutrient medium are prepared having the following composition:

| | |
|---|---|
| Cerelose | grams 1 |
| Edamin | do 1 |
| Cornsteep liquor | ml 0.25 |
| Distilled water to make 50 ml. | |

This medium is adjusted to pH 6.5 with potassium hydroxide, sterilized and inoculated with about 2.5 to 5 ml. of a culture of *Bacillus sphaericus* (MB 431) microorganisms, and the inoculated culture is then incubated at a temperature of 28° C., with agitation, for a 24-hour period. To the resulting culture is added a solution containing 10 mg. of 9α-fluoro-$\Delta^4$-pregnen-17α,21-diol-3,11,16,20-tetrone 21-acetate dissolved in 0.2 ml. of dimethylformamide. The culture containing the steroid compound is incubated, with agitation, for an additional period of about 24 hours at 28° C.

The fermentation broth is then extracted with three 60 ml.-portions of ethyl acetate, and the desired 9α-fluoro-$\Delta^{1,4}$-pregnadien-17α,21-diol-2,11,16,20-tetrone isolated from the ethyl acetate extract following the procedure used in Example 7.

EXAMPLE 9

*9α-fluoro-$\Delta^{1,4}$-pregnadiene-11β,17α,21-triol-3,16,20-trione*

100 ml. of a nutrient medium are prepared having the following composition:

| | |
|---|---|
| Cerelose | grams 2 |
| Edamin | do 2 |
| Cornsteep liquor | ml 0.5 |
| Distilled water to make 100 ml. | |

This medium is adjusted to pH 6.5 with potassium hydroxide, sterilized and inoculated with about 5 to 10 ml. of a culture of *Bacillus sphaericus* (MB 431) microorganisms, and the inoculated culture is then incubated at a temperature of 28° C., with agitation, for a 24-hour period. To the resulting culture is added a solution containing 20 mg. of 9α-fluoro-$\Delta^4$-pregnene-11β,17α,21-triol-3,16,20-trione dissolved in 0.4 ml. of dimethylformamide. The culture containing the steroid compound is incubated, with agitation, for an additional period of about 24 hours at 28° C.

The fermentation broth is extracted with four 100 ml.-portions of ethyl acetate, and the ethyl acetate extracts are combined and evaporated to dryness in vacuo. The residual material is dissolved in acetone and treated with charcoal and diatomaceous earth to remove colored impurities. The decolorized acetone solution is then streaked on paper chromatograms which are developed using formamide as the stationary phase and chloroform as the mobile phase. The upper bands are removed, extracted with methanol and the methanol extract again chromatographed by the paper streak method. The upper band is cut off, dried, extracted with methanol and the methanol extract concentrated to dryness in vacuo. The residue is crystallized from a mixture of ethyl acetate-petroleum ether to give crystalline 9α-fluoro-$\Delta^{1,4}$-pregnadiene-11β,17α,21-triol-3,16,20-trione.

The corresponding 21-acetate derivative of the above product is obtained by refluxing the steroid for 45 minutes with 6 ml. of acetic acid and 0.5 ml. of acetic anhydride. The hot reaction mixture is then cooled and concentrated to a small volume and treated with 5 ml. of water. The 9α-fluoro-$\Delta^{1,4}$-pregnadiene-11β,17α,21-triol-3,16,20-trione 21-acetate is isolated by extracting the mixture with chloroform and removal of the chloroform by distillation.

Other esters such as the t-butyl acetate, propionate, phenyl acetate, benzoate, β,β-dimethylglutarate, oxalate and the like are prepared from the 9α-fluoro-Δ$^{1,4}$-pregnadiene-11β,17α,21-triol-3,16,20-trione by heating with the appropriate acid chloride and isolated according to the procedure described immediately above.

The steroid substrate employed in the fermentation of this example is readily prepared from its corresponding 21-acetate by treatment of the acetate with methanolic hydrochloric acid at room temperature as described in Example 5.

EXAMPLE 10

Δ$^4$-pregnen-17α,21-diol-3,11,16,20-tetrone 21-acetate

A solution of 105 mg. of Δ$^4$-pregnen-16α,17α,21-triol-3,11,20-trione 21-acetate [prepared by the method described in J. Chem. Soc. 4383 (1955)] in 2 ml. of acetic acid is treated with 16.7 mg. of chromium trioxide in 0.1 ml. acetic acid. The reaction mixture is allowed to stand at 25° C. for 16 hours, after which water is added and the steroid is extracted with chloroform. Paper streak chromatography using a benzene-formamide system shows that the main product of the reaction is Δ$^4$-pregnen-17α,21-diol-3,11,16,20-tetrone 21-acetate. Substantially pure material is obtained by chromatography of the chloroform extract over neutral alumina. The desired 16-ketone is isolated from the benzene-chloroform eluates and has a melting point of 178–180° C.

EXAMPLE 11

9α-fluoro-Δ$^{1,4}$-pregnadiene-11β,17α,21-triol-3,16,20-trione 21-acetate 8 ml. of 0.2 M hydrogen peroxide in t-amyl alcohol is added slowly to a mixture of 210 mg. of 9α-fluoro-Δ$^{1,4,16}$-pregnatriene-11β,21-diol-3,20-dione 21-acetate and 14 mg. of osmium tetroxide in 10 ml. of t-amyl alcohol. The reaction mixture is stirred at about 30° C. for ten hours. At the end of this time water is added and the mixture extracted with two 10 ml. portions of chloroform. The chloroform is removed by distillation and the residual material dissolved in 15 ml. of methanol. Excess hydrogen sulfide gas is bubbled through the methanol solution for 15 minutes. Water is added and the mixture is extracted with fresh chloroform.

The chloroform extracts are washed with water, dried over magnesium sulfate and poured over 5 grams of alumina. Elution of the alumina with benzene-chloroform, and removal of the organic solvents in vacuo gives substantially pure 9α-fluoro-Δ$^{1,4}$-pregnadiene-11β,17α-21-triol-3,16,20-trione 21-acetate.

The 9α-fluoro-Δ$^{1,4,16}$-pregnatriene-11β,21-diol-3,20-dione 21-acetate used in this experiment is prepared from 9α-fluoro-Δ$^{1,4}$-pregnadiene-11β,17α,21-triol-3,20-dione 21-acetate by formation of a 3,20-bis-semicarbazone derivative, dehydration with acetic acid and reversal of the semicarbazone as described in Example 1.

In a similar manner 9α-chloro-Δ$^{1,4}$-pregnadiene-11β,17α,21-triol-3,16,20-trione 21-benzoate; 9α-fluoro-Δ$^{1,4}$-pregnadien-17α,21-diol-3,11,16,20-tetrone and 9α-fluoro-Δ$^{1,4}$-pregnadiene-11β,17α-diol-3,16,20-trione are prepared by treatment of the corresponding Δ$^{16}$-compounds with osmium tetroxide and hydrogen peroxide.

EXAMPLE 12

12α-fluoro-Δ$^{1,4}$-pregnadiene-11β,17α,21-triol-3,16,20-trione 21-acetate 2 ml. of pyridine and 7 mg. of osmium tetroxide in 7 ml. of t-amyl alcohol are added to a solution of 300 mg. of 12α-fluoro-Δ$^{1,4,16}$-pregnadiene-11β,21-diol-3,20-dione 21-acetate in 15 ml. of t-amyl alcohol. To this mixture 10 ml. of a 0.035 M solution of hydrogen peroxide in t-amyl alcohol is added dropwise over two hours. The reaction mixture is then stirred at 25° C. for an additional 40 minutes, and then hydrogen sulfide gas bubbled through the solution for 20 minutes.

The mixture is then extracted with two 10 ml. portions of chloroform, the chloroform extracts combined, washed with water and dried. The extract is concentrated in vacuo to a small volume and chromatographed over seven grams of neutral alumina. The column is eluted with benzene-chloroform and the eluates concentrated to dryness, giving a residue of 12α-fluoro-Δ$^{1,4}$-pregnadiene-11β,17α,21-triol-3,16,20-trione 21-acetate.

In a similar fashion 12α-chloro-Δ$^4$-pregnen-17α,21-diol-3,11,16,20-tetrone 21-acetate; 12α-fluoro-Δ$^4$-pregnene-11β,17α,21-triol-3,16,20-trione 21-t-butyl acetate and 12α-fluoro-Δ$^{1,4}$-pregnadien-17α,21-diol-3,11,16,20-tetrone are obtained from the corresponding Δ$^{16}$-compounds. In the case of the free 21-alcohols, it is preferable to carry out the oxidation on a 21-acetate, and subsequently remove the ester function by the method of Example 5. The starting Δ$^{16}$-steroids are prepared by the procedure of Example 1 from the corresponding 17α-hydroxy steroids. These latter compounds are made by the processes disclosed and claimed in our copending application Serial No. 590,828, filed June 12, 1956, now abandoned and by the methods described in Chemistry and Industry, October 27, 1956, page 1232.

Any departure from the above description which conforms to the present invention is intended to be included within the scope of the claims.

What is claimed is:

1. Δ$^4$-pregnene-11β,17α,21-triol-3,16,20-trione.
2. Δ$^4$-pregnene-11β,17α,21-triol-3,16,20-trione 21-acetate.
3. Δ$^4$-pregnene-11β,17α,21-triol-3,16,20-trione 21-tertiary butyl acetate.
4. 9α-fluoro-Δ$^4$-pregnene-11β,17α,21-triol-3,16,20-trione.
5. 9α-fluoro-Δ$^4$-pregnene-11β,17α,21-triol-3,16,20-trione 21-acetate.
6. Δ$^{1,4}$-pregnadien-17α,21-diol-3,11,16,20-tetrone 21-acetate.
7. Δ$^{1,4}$-pregnadiene-11β,17α,21-triol-3,16,20-trione.
8. Δ$^{1,4}$-pregnadiene-11β,17α,21-triol-3,16,20-trione 21-acetate.
9. 9α-fluoro-Δ$^{1,4}$-pregnadiene-11β,17α,21-triol-3,16,20-trione.
10. 9α-fluoro-Δ$^{1,4}$-pregnadiene-11β,17α,21-triol-3,16,20-trione 21-acetate.
11. 9α-fluoro-Δ$^{1,4}$-pregnadiene-11β,17α,21-triol-3,16,20-trione 21-t-butyl acetate.
12. The process which comprises treating 3,11-bis-oxygenated Δ$^{16}$-20-keto steroids of the pregnane series with osmium tetroxide in the presence of a peroxide compound, thereby producing 3,11-bis-oxygenated-16,20-diketo-17α-hydroxy steroids of the pregnane series, wherein the oxygenated functions at positions 3 and 11 are selected from the class consisting of hydroxy and keto groups.
13. The process which comprises treating 3,11-bis-oxygenated Δ$^{16}$-20-keto steroids of the pregnane series with a catalytic amount of osmium tetroxide in the presence of a peroxide compound, thereby producing 3,11-bis-oxygenated 16,20-diketo-17α-hydroxy steroids of the pregnane series, wherein the oxygenated functions at positions 3 and 11 are selected from the class consisting of hydroxy and keto groups.
14. The process which comprises treating 3,11-bis-oxygenated Δ$^{16}$-20-keto steroids of the pregnane series with a catalytic amount of osmium tetroxide in the presence of hydrogen peroxide, thereby producing 3,11-bis-oxygenated 16,20-diketo-17α-hydroxy steroids of the pregnane series, wherein the oxygenated functions at positions 3 and 11 are selected from the class consisting of hydroxy and keto groups.

15. The process which comprises treating $\Delta^{4,16}$ - pregnadiene - 11$\beta$,21 - diol - 3,20 - dione 21 - acetate with osmium tetroxide and hydrogen peroxide thereby producing $\Delta^4$ - pregnene - 11$\beta$,17$\alpha$,21 - triol - 3,16,20 - trione 21 - acetate.

16. The process which comprises treating 9$\alpha$ - fluoro-$\Delta^{4,16}$ - pregnadiene - 11$\beta$,21 - diol - 3,20 - dione 21 - acetate with osmium tetroxide and hydrogen peroxide thereby producing 9$\alpha$ - fluoro - $\Delta^4$ - pregnene - 11$\beta$,17$\alpha$,21-triol - 3,16,20 - trione 21 - acetate.

17. The process which comprises treating 9$\alpha$ - fluoro-$\Delta^{4,16}$ - pregnadiene - 11$\beta$,21 - diol - 3,20 - dione 21 - t-butyl acetate with osmium tetroxide and hydrogen peroxide thereby producing 9$\alpha$ - fluoro - $\Delta^4$ - pregnene - 11$\beta$, 17$\alpha$,21 - triol - 3,16,20 - trione 21 - t - butyl acetate.

18. The process which comprises treating $\Delta^{1,4,16}$ - pregnatriene - 11$\beta$,21 - diol - 3,20 - dione 21 - acetate with osmium tetroxide and hydrogen peroxide thereby producing $\Delta^{1,4}$ - pregnadiene - 11$\beta$,17$\alpha$,21 - triol - 3,16,20 - trione 21 - acetate.

19. The process comprising treating 3,20 - diketo - 11-oxygenated - 16,17$\alpha$ - dihydroxy - pregnanes having a double bond attached to the C–5 carbon atom with chromium trioxide thereby producing 3,16,20 - triketo-11 - oxygenated - 17$\alpha$ - hydroxy - pregnanes having a double bond attached to the C–5 carbon atom, wherein the 11 - oxygenated function is selected from the class consisting of hydroxy and keto groups.

20. The process which comprises treating 9$\alpha$ - fluoro-$\Delta^{1,4,16}$ - pregnatriene - 11$\beta$,21 - diol - 3,20 - dione 21-acetate with osmium tetroxide and hydrogen peroxide thereby producing 9$\alpha$ - fluoro - $\Delta^{1,4}$ - pregnadiene - 11$\beta$, 17$\alpha$,21 - triol - 3,16,20 - trione 21 - acetate.

21. 3,16,20 - triketo - 11 - oxygenated - 17$\alpha$ - hydroxy steroids of the pregnane series having a double bond in the 4:5 position, wherein the oxygenated group at the 11 position of the steroid nucleus is a hydroxy group.

22. A member of the class consisting of steroids having the formula

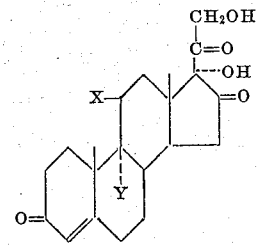

wherein X is a hydroxy group, Y is selected from the class consisting of hydrogen and halogen, and C–21 lower alkanoates thereof.

23. A member of the class consisting of steroids having the formula

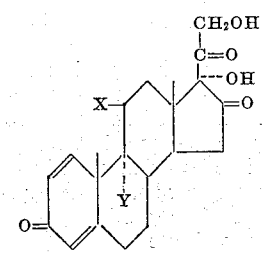

wherein X is selected from the class consisting of keto and hydroxy groups, Y is selected from the class consisting of hydrogen and halogen, and C–21 lower alkanoates thereof.

24. A compound having the formula

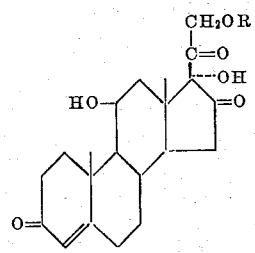

wherein R is the residue of a lower aliphatic acid.

25. A compound having the formula

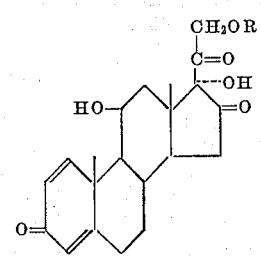

wherein R is the residue of a lower aliphatic acid.

26. A compound having the formula

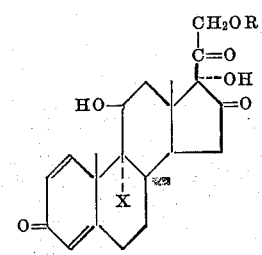

wherein R is the residue of a lower aliphatic acid and X is halogen.

27. A compound having the formula

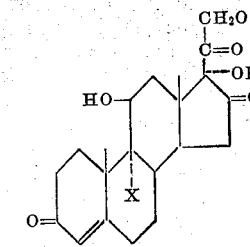

wherein R is the residue of a lower aliphatic acid and X is halogen.

28. The process which comprises treating a compound having the formula

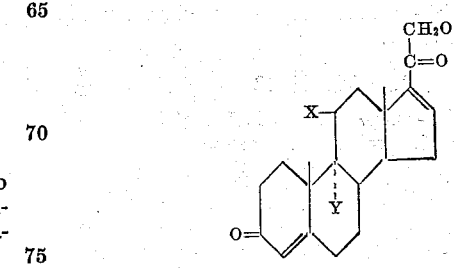

with osmium tetroxide and hydrogen peroxide thereby forming a compound having the formula

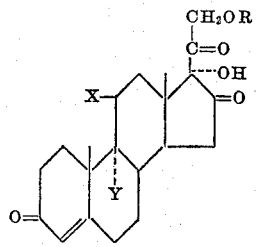

wherein X is selected from the class consisting of keto and hydroxy, Y is selected from the class consisting of hydrogen and halogen, and R is selected from the class consisting of hydrogen and lower acyl radicals.

29. The process which comprises treating a compound having the formula

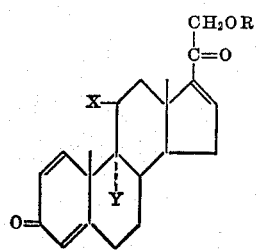

with osmium tetroxide and hydrogen peroxide thereby forming a compound having the formula

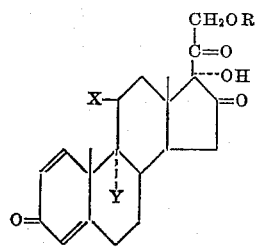

wherein X is selected from the class consisting of keto and hydroxy, Y is selected from the class consisting of hydrogen and halogen, and R is selected from the class consisting of hydrogen and lower acyl radicals.

References Cited in the file of this patent
UNITED STATES PATENTS 2,901,492    Herz et al. _____ Aug. 25, 1959